April 26, 1960 — E. L. E. PARDEE — 2,934,204

PACKAGED TREE

Filed July 22, 1957

INVENTOR
EDWARD L. E. PARDEE
BY
Gilbert B. Gehrenbeck
AGENT

United States Patent Office 2,934,204
Patented Apr. 26, 1960

2,934,204

PACKAGED TREE

Edward L. E. Pardee, White Bear Lake, Minn.

Application July 22, 1957, Serial No. 673,403

3 Claims. (Cl. 206—46)

This invention relates to the packaging of trees, and has particular application to the packaging of pre-cut conifers commonly known and sold as "Christmas trees."

Spruce and balsam trees designed for the Christmas market are normally cut well in advance of the season, pressed compactly together in large numbers, and transported for long distances, before again being spread out to initial size and shape for sale. Other species, notably pine, cannot successfully undergo such treatment. The trees withstand storage only if cut and maintained under low temperatures. At such temperatures the branches cannot be bent or the trees compressed without severe breakage. Prolonged storage of any of these species, particularly under dry conditions, results in severe loss of needles when the trees are put in use.

Christmas trees are ordinarily supported for display in one or another of a variety of stands, preferably adjustable to different trunk diameters and with a receptacle for retaining a supply of water at the cut end of the trunk. These stands are frequently unstable, so that the tree is easily tipped; whereupon the stand may be damaged, and the water is invariably spilled.

The present invention overcomes these and other difficulties and disadvantages. There is provided a packaged cut tree which remains fresh in appearance during prolonged storage and at surprisingly high storage temperatures. The trees may therefore be cut and packed during moderate or warm weather, shipped for long distances, and used with complete satisfaction during the appropriate season. Furthermore the tree is provided with an attached and fully adjusted stand, and with a self-contained spill-proof receptacle for water. Preferably, the entire assembly is combustible for easy disposal when the tree has served its purpose.

The invention will now be further described and illustrated in connection with the appended drawings, in which.

Figure 1:
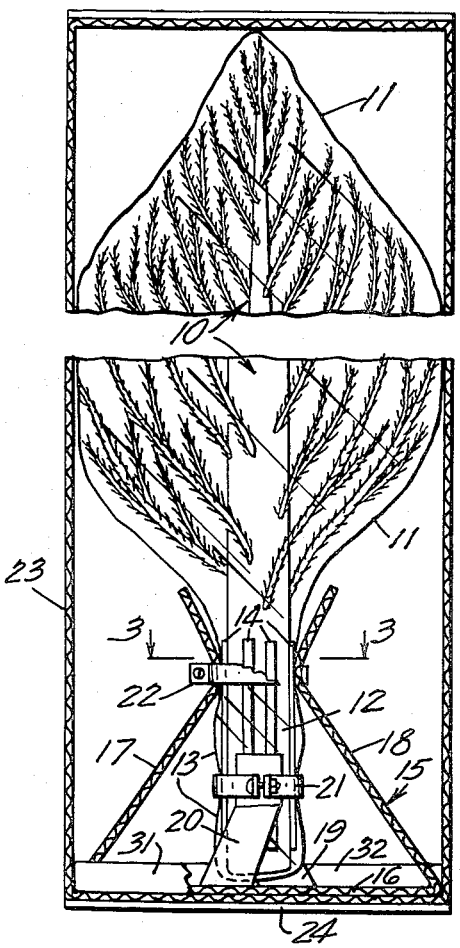
Figure 1 is a representation, partly in section and with portions cut away, of a completely packaged Christmas-tree unit including disposable display stand and shipping carton.

The entire tree 10 of Figure 1 is enclosed within a hermetically sealed bag or envelope 11, suitably of polyethylene film or other waterproof sheet material, terminating in a lower extension 13 which loosely surrounds the base portion 12 of the trunk of the tree. A number of channel-forming elongate bars or slats 14 are fastened to the base 12 within the bag extension 13 and provide vertical channels along the vertically held trunk. A support or stand member 15 supports the tree and comprises a foot member 16, outer braces 17 and 18, and inner braces 19 and 20. The braces are clamped to the base 12, over the bag extension 13, and intermediate the ends of the channel-forming members 14, by suitable clamping means here indicated as screw-operated hose clamps 21 and 22. The entire unit is contained within a shipping carton 23 designed to be opened by removal of the end 24.

Figure 2:
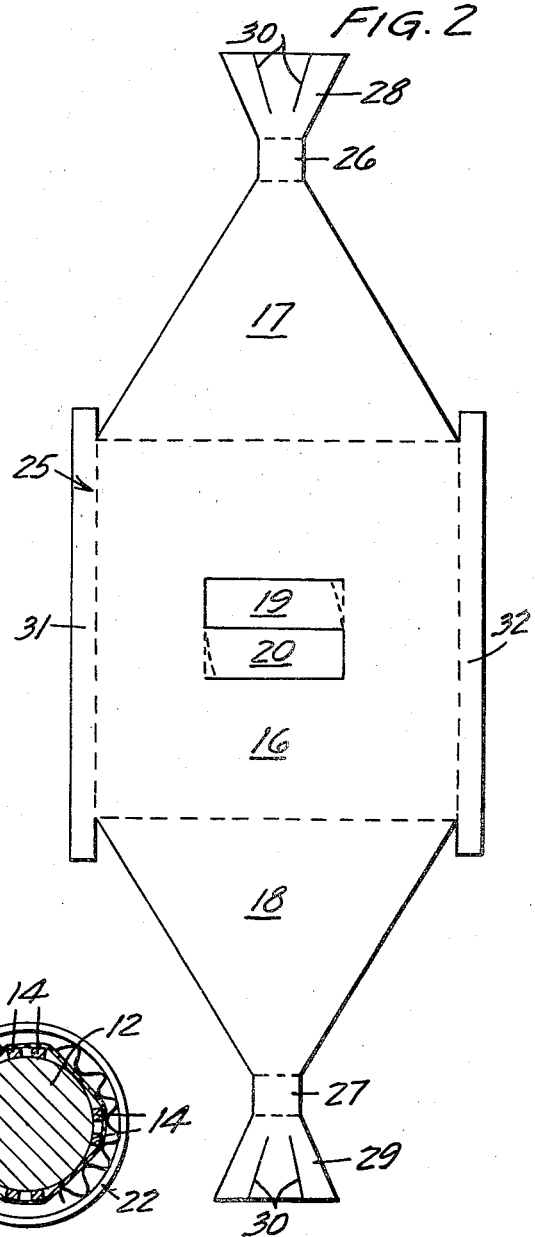
Figure 2 is a plan view of a pre-cut blank for a disposable stand as shown in Figure 1.

A typical blank 25 from which is formed the support 15 is illustrated in Figure 2. Such a blank is conveniently formed of rigid corrugated boxboard as indicated in Figure 1. Triangular brace members 17 and 18, foldably connected along base lines to foot member 16, terminate at the opposite vertex in elongate neck portions 26, 27 which extend into inverted triangular end-pieces 28, 29, the latter being furcated as indicated by cut-lines 30. Stiffening members 31, 32 are foldably connected along opposite sides of the foot member 16 and desirably include extended end tabs which may be folded over the upraised brace members 17, 18 and fastened in place, adding rigidity to the assembled structure. Inner brace members 19 and 20 are formed of tabs cut from the central portion of the foot member 16, foldably attached thereto at opposite ends, and further folded to extend radially toward a centrally positioned tree-trunk, the fold lines being indicated by dotted lines in the figure.

Figure 3:
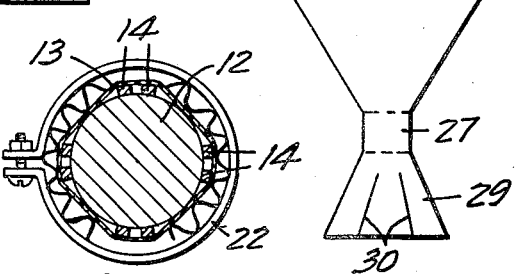
Figure 3 is a section of the clamp and channel assembly as applied in the unit of Figure 1, taken along line 3—3.

The freshly cut tree is first provided with vertical water-carrying channels along the base section of the trunk. As illustrated in Figures 1 and 3, these may be formed by attaching a number of upright parallel wooden slats 14 to the base. Eight such slats are illustrated, but more or less may be used. Preferably the slats are attached in pairs, to ensure an open channel therebetween after the clamp members are applied, as indicated in Figure 3. The slats may be of sufficient length to form continuous channels beneath both upper and lower clamp areas, or separate sets of shorter slats may be applied under the separate clamp areas. The slats may be nailed or adhered directly to the trunk, held in place by encircling straps, bands, wires or the like, or attached in other ways. A convenient procedure involves mounting the slats on one or more strips of pressure-sensitive tape and then encircling the trunk with the tape to hold the slats firmly in place thereon.

The bag 11 is next pulled over the tree, the base 12 of the trunk entering the extended portion 13. Conveniently, the bag is first gathered upon a rigid ring through which the tree is then forced, base first, to compress the branches upwardly and toward the trunk, while the bag covers the tree and retains the branches in compressed position. The open upper end of the bag is then hermetically sealed. Although not ordinarily necessary, small amounts of water may be introduced before sealing the bag. Preservatives such as mold inhibitors, scents such as pine oil, and other analogous materials may likewise be added if desired.

The bag 11 and extension 13 are illustrated in Figure 1 as being a continuous one-piece envelope, such as may be assembled from polyethylene film or the like. Such a structure is fully effective and provides for maximum economy. If desired, however, the extension may be separately constructed, e.g., of heavier film or tubing, and joined to the bag 11 by heat-sealing. Somewhat analogously, a heavy and substantially rigid tubular extension fastened directly to a rigid foot member may be provided to serve both as the extension of the bag 11 and also as a support for the tree. In such a structure the lower portion of the bag is preferably adhesively fastened to the upper portion of the tubular base, and the latter is provided with internal wedge or block members for centering and holding the tree in place and for providing water-carrying channels. However, the simplified one-piece envelope of Figure 1 has a number of advantages, as indicated, and is preferred.

The blank 25 is folded to form the stand 15 which is attached to the tree prepared as just described. The lower braces 19, 20 are folded upwardly from the foot member 16 and toward the trunk, and are clamped thereto with the encircling clamp member 21. The upper braces 17, 18 are then similarly folded into position and clamped in place. With perfectly formed trees the result is substantially symmetrical as illustrated in Figure 1. The stand is also useful with trees having crooked trunks, in which case the extended neck portions 26, 27 permit adjustment of the angles formed between the foot member 16 and the two brace members 17 and 18 while still providing adequate area for clamping.

With the braces clamped in place, the stiffening members 31, 32 are folded upwardly and the extended ends fastened to the braces 17 and 18 to hold the stiffeners in place and rigidify the foot member 16. The tree is then ready to be placed in the protective carton 23. The opening provided in the foot member by removal of the sections forming the lower clamp members 19, 20 serves as a convenient handle opening through which the operator's fingers may be inserted for grasping the unit while placing it within, or removing it from, the carton 23.

The purchaser, on removing the tree unit from the carton, spreads the extended end-pieces 27, 28 to form a roughly conical support surrounding the trunk, severs the lower extension 13 from the remainder of the bag 11 along a circumference somewhat above the upper open end of the conical support, and folds or drapes the severed end of the extension 13 over the support thus provided, to form an enlarged funnel-shaped opening into which water may then be poured. The remainder of the bag 11 is stripped from the tree, permitting the branches to be spread out into their original position. Water added as just described flows through the channels between bag and trunk into the closed lower end of the bag, as required to replace water evaporated from the exposed tree.

The conical opening provided by the furcated ends 28, 29 is convenient but not essential, since the open end of the extension 13 may be temporarily lifted above the upper clamp area by hand to receive water. Placing a separate collar of boxboard around the upper clamp area may also serve to support the upper portion of the container wall.

Figure 4:
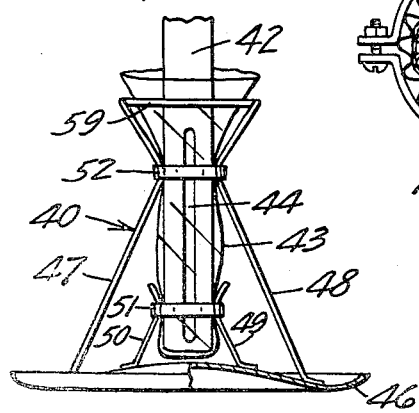
Figure 4 illustrates an alternative stand, clamp and channel assembly, the stand being shown partly in section.

A modification of the stand member, clamping members, and channel means just described is illustrated in Figure 4; and others will become apparent on consideration of the disclosure. The stand or support 40 of Figure 4 has a disc-shaped foot portion 46, shown partly in section, to which are attached outer braces 47, 48 and inner braces 49, 50. For convenience, two of each are illustrated, although three or more of each will normally be supplied, at equally spaced locations around the foot member, in order to impart desired stability to the tree without requiring excessively massive construction. Clamping straps 51 and 52 are provided to fasten the inner and outer brace members respectively against the trunk. These straps may be screw-tightened as are the hose clamps illustrated in Figures 1 and 3, and preferably will be permanently fastened to one of the brace members. A ring member 59 is provided, if desired, to fit around the extended tips of the outer braces 47, 48 and form a support for the open end of the envelope extension 43. Longitudinal grooves 44 are formed at intervals around the circumference of the trunk 42 to serve as channels for flow of water from the upper funnel-like open end of the envelope 43 beneath the clamp areas to the closed lower end of the envelope.

Steel straps or bands, twisted wires, reinforced or strongly retractable adhesive tapes, or other equivalent clamping means may replace the screw-clamps illustrated. Fluted metal collars or strips, metal or rigid plastic tubes, or other channel means may replace the slats or grooves illustrated. Other modifications and substitutions may be made without departing from the scope of the invention as defined in the ensuing claims.

What I claim is as follows:

1. As a new combination, a fresh-cut tree enclosed within a hermetically sealed waterproof envelope having a lower extension surrounding the base of the trunk of said tree, a support or display stand member for supporting said tree in upright position and attached to said base by clamping means encircling said trunk and said lower extension, and channel means, within said extension and beneath said clamping means, for permitting flow of water from above to below said clamping means while the tree is supported in upright position.

2. A packaged Christmas tree including a fresh cut conifer enclosed within a hermetically sealed waterproof envelope having a lower extension surrounding the base of the trunk of said tree, a disposable support or display stand member attached to said base by clamping means encircling said trunk and said lower extension, and a plurality of elongate channel-forming members arranged around the circumference of and parallel to said trunk within said extension and beneath said clamping means, for providing open channels along said trunk.

3. A packaged Christmas tree including a fresh cut conifer enclosed within a hermetically sealed waterproof flexible envelope having a lower extension surrounding the base of the trunk of said tree; a disposable support or stand member of rigid corrugated boxboard comprising a foot member having upwardly folded outer brace members clamped over said envelope extension to an upper area of said base and inner brace members, formed of upwardly folded central segments of said foot member, clamped over said extension to a lower area of said base; channel means along said base, beneath said extension and said clamped brace members, for providing open channels along said trunk; the whole being enclosed within a shipping carton and readily liftable from an opened end thereof on grasping said foot member through the central aperture outlining said central segments.

References Cited in the file of this patent

UNITED STATES PATENTS

| 1,906,293 | Watowski | May 2, 1933 |
| 1,988,886 | Wilson | Jan. 22, 1935 |
| 2,341,374 | Gardner | Feb. 8, 1944 |
| 2,771,260 | Thom | Nov. 20, 1956 |
| 2,821,297 | Callinicos | Jan. 28, 1958 |

FOREIGN PATENTS

| 488,751 | Great Britain | July 13, 1938 |